(12) United States Patent
Chang et al.

(10) Patent No.: US 7,758,233 B2
(45) Date of Patent: Jul. 20, 2010

(54) LAMP ASSEMBLY FOR EDGE BACKLIT LIQUID CRYSTAL DISPLAY PANEL AND METHOD OF MANUFACTURING SAME

(75) Inventors: Woong-Jae Chang, Chungcheongnam-do (KR); Jung-Tae Kang, Gyeonggi-do (KR); Joo-Yeon Won, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 85 days.

(21) Appl. No.: 11/836,428

(22) Filed: Aug. 9, 2007

(65) Prior Publication Data

US 2008/0037278 A1 Feb. 14, 2008

(30) Foreign Application Priority Data

Aug. 11, 2006 (KR) .................. 10-2006-0076288

(51) Int. Cl.
*F21V 7/04* (2006.01)
*F21V 21/00* (2006.01)

(52) U.S. Cl. .............. 362/634; 362/632; 362/217.14
(58) Field of Classification Search .......... 362/221, 362/611, 613, 614, 630, 632, 633, 634, 217.1, 362/217.14
See application file for complete search history.

(56) References Cited

U.S. PATENT DOCUMENTS

| | | | | | |
|---|---|---|---|---|---|
| 1,376,712 | A | * | 5/1921 | Liebold | 439/892 |
| 2,945,202 | A | * | 7/1960 | Roney et al. | 439/232 |
| 3,436,716 | A | * | 4/1969 | Amis, Jr. et al. | 439/232 |
| 5,558,420 | A | * | 9/1996 | Oki et al. | 362/634 |
| 5,588,740 | A | * | 12/1996 | Kasuga | 362/221 |
| 6,409,356 | B1 | * | 6/2002 | Nishimura | 362/632 |
| 6,869,298 | B2 | * | 3/2005 | Latsis | 439/157 |
| 7,236,155 | B2 | * | 6/2007 | Han et al. | 345/102 |
| 7,344,397 | B2 | * | 3/2008 | Miyazono | 439/232 |
| 7,448,784 | B2 | * | 11/2008 | Tanaka | 362/611 |
| 2003/0123258 | A1 | * | 7/2003 | Nitto et al. | 362/373 |
| 2005/0047110 | A1 | * | 3/2005 | Huang et al. | 362/31 |
| 2006/0063410 | A1 | | 3/2006 | Lin | |
| 2006/0194463 | A1 | * | 8/2006 | Lin | 439/242 |
| 2006/0274552 | A1 | * | 12/2006 | Kim et al. | 362/612 |
| 2006/0279957 | A1 | * | 12/2006 | Kwon et al. | 362/378 |

* cited by examiner

*Primary Examiner*—Jong-Suk (James) Lee
*Assistant Examiner*—David R Crowe
(74) *Attorney, Agent, or Firm*—Innovation Counsel LLP

(57) ABSTRACT

A lamp assembly includes a lamp housing for housing one or more predefined tubular lamps and at least a first lamp socket for coupling to and removably retaining respective first electrodes of the one or more lamps and for further coupling an integral conduction path of the lamp housing to at least one of the first electrodes.

24 Claims, 11 Drawing Sheets

LAMP ASSEMBLY FOR EDGE BACKLIT LIQUID CRYSTAL DISPLAY PANEL AND METHOD OF MANUFACTURING SAME

CROSS-REFERENCE TO RELATED APPLICATIONS

This application relies for priority upon Korean Patent Application No. 2006-76288 filed on Aug. 11, 2006, the disclosure of which is incorporated herein by reference.

BACKGROUND

1. Field of Invention

The present disclosure of invention relates to a lamp assembly for use in a backlighted liquid crystal panel and more particularly to a lamp assembly having a structure that allows for manufacture with fewer parts, better alignability and reduced manufacturing cost.

2. Description of Related Art

A typical liquid crystal display (LCD) panel includes means for projecting an artificial light from behind the LCD array so as to better display a computer-generated or other pixel-based image using electrical characteristics and optical characteristics of a liquid crystal material included in the LCD array.

The typical LCD device includes a liquid crystal control unit that controls electrical signals applied to the liquid crystal material and it further includes a light-providing unit that provides light for illuminating the liquid crystal array even when used in darkness. For example, the typical LCD device includes an LCD panel assembly having the liquid crystal control unit, and a backlighting assembly serving as the light-providing unit of the LCD panel.

The backlighting assembly typically has a light source such as one or more fluorescent lamps inserted therein for generating light. Backlighting assemblies may be classified as being either of a direct illumination type of backlighting or as of an edge-illuminated type of backlighting depending on the position of the main light source. A typical edge-illumination type backlighting assembly includes a light guiding plate for disposition behind the LCD panel and a lighting source such as one or more fluorescent lamps or an array of light emitting diodes (LEDs) disposed at a side edge of the light guiding plate for directing light into the guiding plate. The guiding plate then guides the light through a back portion of the LCD array for projection of a resulting image towards the eyes of a user.

A typical edge-illumination type backlighting assembly includes a lamp assembly having at least one high voltage lamp of a thin and long cylindrical shape. The lamp is electrically connected to a high voltage generator (i.e., an inverter) through a set of power supply wires so as to receive electrical power from the generator/inverter and thereby generate light energy.

A conventional lamp assembly includes a lamp reflector, a lamp holder for receiving two or more cylindrical lamps, a set of power supply wires, a series-tapping return wire for returning a control signal to the power supply from a tap point provided along a series connection of lamps, a fixing tape for adhesively fixing the return wire to the assembly, a wire harness for harnessing the power supply and return wires, etc. The conventional lamp assembly is manually assembled as follows. The lamp holder is physically connected at solderable portions thereof to the power supply wires of the harness, and the power supply wires are then soldered to the lamp holder with the use of a hot soldering iron, solder flux and a spool of solder. Then, the so soldered lamp holder is closed so as to protectively house the soldered portion, and the lamp holder is thereafter mechanically coupled to the lamp reflector. Thereafter, the tap-point return wire is manually positioned into a groove formed on a rear surface of the lamp reflector, and the return wire is affixed to the assembly by using the fixing tape.

As described above, the conventional manufacture of the conventionally-structured lamp assembly includes the use of many parts, and many separate manual steps, each requiring good dexterity and each subject to something possibly going wrong during the manufacturing process. Additionally the tap-return wire of the conventional lamp assembly is routed to extend from a backside to another side of the lamp assembly and this presents an opportunity for the wire to be hooked and pulled off or something else to go wrong. Thus, the conventional lamp assembly has a structure that calls for a complex and manual assembly process in which a number of things can go wrong, thereby increasing manufacturing cost of the lamp assembly and making its manufacture less than fully reliable.

SUMMARY

The present disclosure of invention provides a lamp assembly having a structure that is easy and reliable to assemble and thus capable of enjoying reduced manufacturing costs.

In one embodiment, a lamp assembly includes an optically reflective and electrically conductive lamp housing and first and second lamp sockets that are structured for easy self-aligning fastening to the lamp housing, for automatic electrical coupling of at least the first socket to the housing and for simplified connection of a tap return wire to the first socket by way of a connection made through the body of the lamp housing. In one embodiment, each of a series connected plurality of fluorescent lighting lamps has a first external connection electrode and a second external connection electrode. The first and second external connection electrodes are used to supply electrical power to their respective lamps and to thus enable the lamps to generate light. The lamp housing receives and houses the lamp bodies. The first lamp socket is fastened to the lamp housing so as to be able to receive at least a first end portion of each of the lamps and to secure the lamps to the housing. The first lamp socket electrically connects the first electrodes of at least two lamps one to the other. The first socket also electrically connects the tap point defined by the lamp-to-lamp electrodes connection to an electrically-conductive first portion of the lamp housing. A tap return wire is connected to another part of the electrically-conductive portion of the lamp housing to thereby provide a coupling of the tap point to a control terminal of an associated power supply.

In one embodiment, the first lamp socket includes a socket body having a receiving space sized to receive end portions of two or more lamps and a set of electrode-receiving terminals disposed in the receiving space of the first socket body for receiving, retainably clamping to and electrically connecting to the first electrodes of the two or more lamps and for electrically interconnecting the first electrodes to one another and further to an electrically conductive portion of the lamp housing.

The first lamp socket may have an opening through which the at least two lamps extend outwardly, and the first lamp socket may further include a first cover for covering the lamps receiving space so as to impede the entry of dust, debris or other undesirable materials into the receiving space. The first cover may be hingedly-coupled to the first socket body or deformably bent into position to thereby enclose the lamps receiving space.

In one embodiment, the set of electrode-receiving terminals that are disposed in the receiving space of the first socket define first electrode fixing portions for mechanically fastening to (i.e., removably retaining) the first electrodes and electrically connecting to the first electrodes of the lamps inserted into the first socket. The set of electrode-receiving terminals further define a housing interconnect portion for mechanically attaching to and electrically connecting to the lamp housing, and a connection extension portion for electrically interconnecting the first electrode fixing portions with the housing interconnect portion. The first electrode fixing portions fix the positions of the corresponding lamps and support those lamps by way of their first electrodes.

In an exemplary embodiment, an interconnect throughhole is formed through a base portion of the first lamp socket, and the lamp housing includes a protruding contact terminal protruding from a base surface of the lamp housing for extending inwardly into the first lamp socket through the interconnect throughhole. The connection extension portion in the first socket may have a clip or clamp shape into which the protruding contact terminal of the lamp housing is inserted to thereby establish an electrical connection between the electrically conductive portion of the lamp housing and the connection extension portion in the first socket. In another exemplary embodiment, a throughhole is formed at the bottom of the first lamp socket, and the housing connecting portion outwardly extends from the first lamp socket through the throughhole to electrically connect to an inner surface of the lamp housing. In still another exemplary embodiment, a throughhole is formed at the first lamp socket, and the housing connecting portion is formed on both inner and outer surfaces of the first lamp socket that are adjacent to the throughhole and a portion of the first lamp socket that connects the inner and outer surfaces through the throughhole defines the electrical connection of the extension portion to the inner surface of the lamp housing.

In one embodiment, at least two lamps may be received side-by-side in the lamp housing, and the first lamp socket may further include an insulating rib protruding from an inner surface of the first lamp socket and extending to be disposed between the first electrodes of the lamps to thereby dielectrically separate the two lamps.

The lamp assembly may optionally further include a second lamp socket that is disposed at another end of the lamp housing to receive opposed end portions of the two or more lamps and further secure the lamps to the lamp housing. The second lamp socket electrically connects respective second electrodes of the two or more lamps to corresponding power supply wires provided for applying ignition and plasma sustaining voltages the respective lamps.

The second lamp socket may include a socket body having a receiving space for receiving corresponding end portions of the lamps and second electrode-receiving terminals disposed in the receiving space of the second socket body for electrically connecting to the second electrodes of the lamps and coupling those second electrodes to the power supply wires. The second lamp socket may have an opening through which the corresponding end portions of the lamps are received into the second lamp socket, and the second lamp socket may further include a second cover for covering the opening to block dirt and debris from entering the lamp receiving space. In one embodiment, the second cover is hingedly-coupled to the second socket body. The second electrode-receiving terminals include, for example, respective second electrode fixing portions for mechanically fastening to and electrically connecting to the second electrodes of the lamps and wire connecting portions for electrically connected to respective power supply wires.

BRIEF DESCRIPTION OF THE DRAWINGS

The above and other features relating to the present disclosure of invention will become clearer when studied in view of the detailed exemplary embodiments disclosed below with reference to the accompanying drawings, in which.

DETAILED DESCRIPTION

Figure 1:
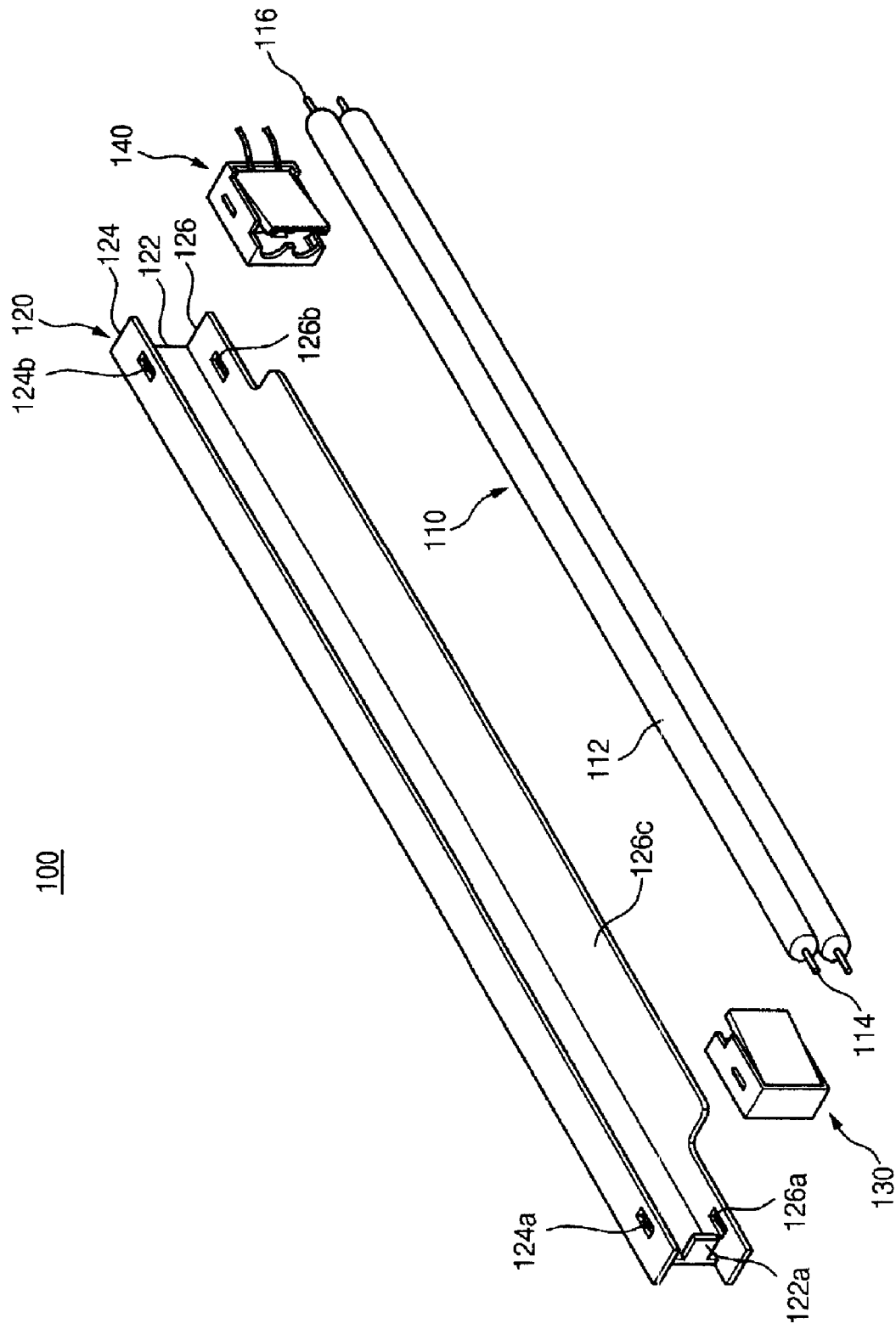
FIG. 1 is an exploded perspective view illustrating a lamp assembly according to a first exemplary embodiment.

The below detailed descriptions, including the accompanying drawings, provide examples of embodiments in accordance with the present disclosure of invention. The inventive subject matter may, however, be embodied in many different forms and variations and should not be construed as being limited to the exemplary embodiments set forth herein. A variety of different materials may be used to provide the described functions including electrically conductive metals, optically reflective materials, and/or electrically insulating plastics or ceramics. It will be understood that when an element is referred to herein as being "on" or "onto" or "coupled" to another element, it may be directly disposed on or attached to the other element or intervening elements may also be present. In contrast, when an element is referred to as being "directly on" or "directly coupled to" another element, then no intervening elements may be present. Like reference numerals generally refer to similar or identical elements throughout.

FIG. 1 is an exploded perspective view illustrating a lamp assembly 100 in accordance with the present disclosure.

Referring to FIG. 1, the lamp assembly 100 optionally includes a supplied set 110 of fluorescent lamps, and the assembly 100 includes an electrically-conductive lamp housing 120 (i.e., one having an optically reflective and electrically conductive inner surface made of polished aluminum for example). The lamp assembly 100 further includes, a first lamp socket 130 structured for fastening and electrical connection to a left end portion of the lamp housing, and a second lamp socket 140 structured for fastening to a right end portion of the lamp housing.

The lamps set 110 may include, for example, a pair of cold cathode fluorescent lamps (CCFLs) that are to be operated in a series connected circuit. Each lamp of set 110 includes a cylindrical lamp body 112, a first electrode 114 at its left end and a second electrode 116 at its right end.

The lamp body 112 includes a glass lamp tube having, for example, a rod shape. The first electrode 114 and the second electrode 116 are formed at both end portions of the lamp body 112. The lamp set 110 externally receives a relatively high voltage through its second electrodes 116 and responsively generates light.

The first electrode 114 and the second electrode 116 may respectively serve as a cold electrode and a hot electrode. The hot electrodes 116 are electrically connected to a power supply unit (not shown) such as, for example, to a DC to high voltage AC or DC converter or inverter. The first electrodes 114 interconnect to define an intermediate tap point in the series circuit and this tap point is desirably electrically connected back to the power supply unit to provide a tap-point feedback signal to the power supply unit. The power supply unit may use a voltage detected at the tap-point for determining how to stably drive the lamp set 110. In the case where high voltages of opposite polarity are applied to the hot electrodes 116, the tap point defined by interconnection of the first electrodes 114 will be at a voltage equal to or near the ground voltage or neutral output voltage of the power supply.

Although the embodiment of FIG. 1 has two lamps in set 110, alternatively, the lamp assembly 100 may operate with just one lamp 112, or three lamps connected in series or in a series parallel combination.

The lamp housing 120 is preferably composed of an electrically conductive, optically reflective and easily workable metal such as aluminum or an alloy thereof and it may include a relatively rigid base plate 122 at its back, a somewhat flexible first sidewall 124 at its top and a larger second sidewall 126 at its bottom. The first socket 130 is used to electrically and mechanically connect the left end of the lamp housing 120 to the first electrodes 114 of the lamp set 110. The second socket 140 is used to mechanically connect the right end of the lamp housing 120 to the second electrodes 116 while keeping the housing 120 electrically insulated from the second electrodes 116 of the lamp set 110. In one embodiment, the light reflecting inner surfaces of the lamp housing 120 are coated with an electrically insulative and corrosion-preventing material (i.e., aluminum oxide) and thus it is not possible to make direct electrical contact to the lamp housing via this corrosion-preventing coating.

The inner surfaces of the base plate 122, the first sidewall 124 and the second sidewall 126 define a receiving space for the lamp set 110. An opening is defined over the region facing the inner portion of the base plate 122. The lamp set 110 is received through this opening, and the light generated from the received lamp set 110 is output externally through this opening. The lamp housing 120 may reflect some of the light generated from the lamp set 110 towards the front. Thus, the inner surfaces of the lamp housing 120 may include a material having a great optical reflectivity such as a silvery or a white paint. Preservation of the optical reflectivity of this inner surface material is desirable and thus a transparent and/or corrosion-preventing coating will typically be applied over it. Additionally, the lamp housing 120 may include anti-corrosive electrical contact claddings placed elsewhere thereon (i.e., at portions 122a, 126c) where the electrical contact a claddings are made of nickel and where electrical connections are to be made to such clad portions (i.e., at portions 122a, 126c) as shall be described momentarily.

The base plate 122 includes a protruding terminal contact portion 122a to be mechanically and electrically connected to the first lamp socket 130.

The first sidewall 124 and the second sidewall 126 protrude from the base plate 122, and enclose a portion of a periphery of the lamp set 110. First throughholes 124a and 124b, and second throughholes 126a and 126b are formed through the first sidewall 124 and the second sidewall 126, respectively, to mechanically and/or electrically couple the first and second lamp sockets 130 and 140 to the lamp housing 120 as shall be detailed herein. A lower sidewall extending portion 126c is formed as part of the second sidewall 126. The sidewall extending portion 126c is more protrusive than the first sidewall 124 by a predetermined length.

The first lamp socket 130 is disposed in the receiving space of the lamp housing 120. The first lamp socket 130 receives and fixes a first end portion of the lamps set 110, and electrically connects the first electrodes 114 of the lamps set 110 to each other and to an electrically conductive portion (i.e., 122a) of the lamp housing 120. The lamp housing 120 includes a conductive material such as an aluminum containing back base surface for providing integral electrical coupling from the left end (112a) of the housing to the right end of the housing 120. Thus, the first lamp socket 130 may receive a tap-point feedback signal from the first electrodes 114 of the lamps set 110 and it may couple that tap-point feedback signal to an external circuit (i.e., a power supply having wires 147, not fully shown) provided at the right end of the housing by passing the return signal through the lamp housing 120.

Hereinafter, the first lamp socket 130 will be described in detail with reference to the accompanying drawings.

Figure 2:
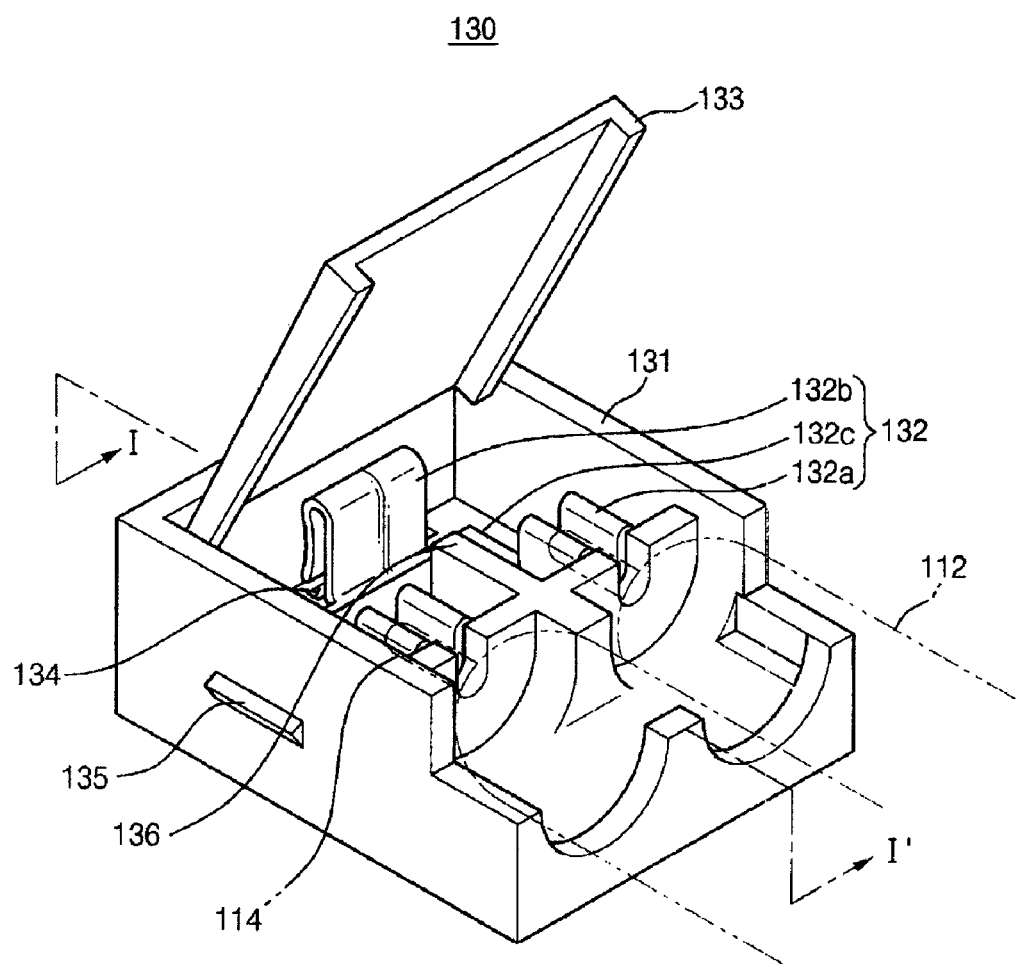
FIG. 2 is an enlarged perspective view of the first lamp socket of the lamp assembly illustrated in FIG. 1.
Figure 3:
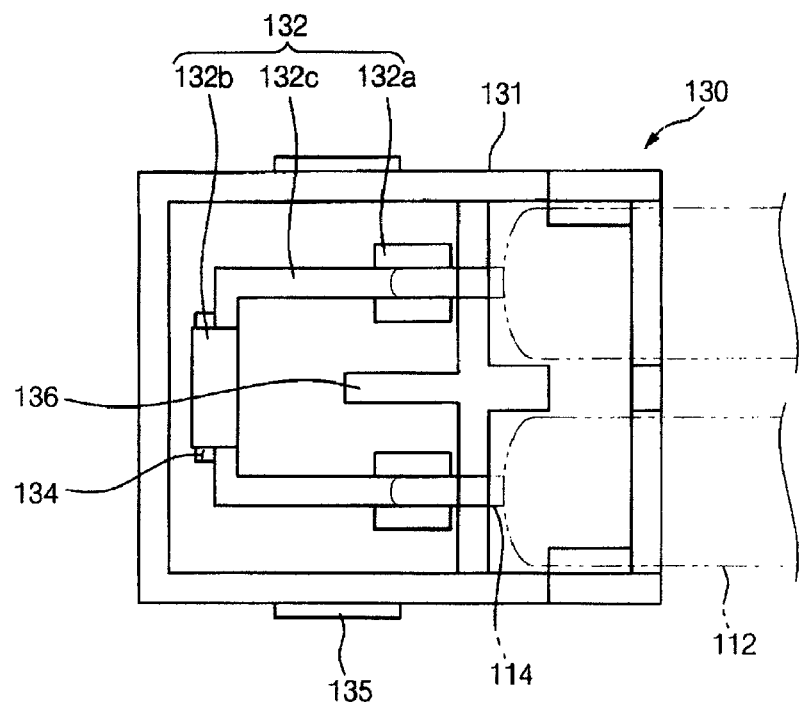
FIG. 3 is a plan view of the first lamp socket of the lamp assembly illustrated in FIG. 2.
Figure 4:
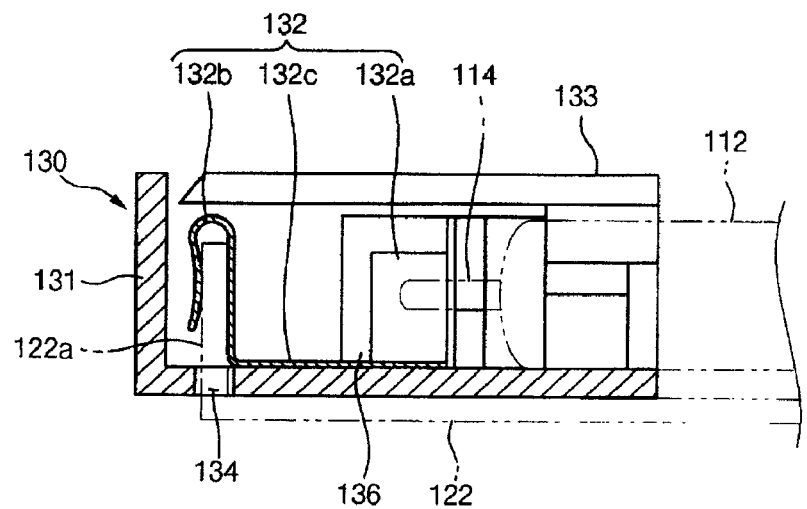
FIG. 4 is a partial cross-sectional view taken along a line I-I' in FIG. 2.

FIG. 2 is an enlarged perspective view of the first lamp socket of the lamp assembly illustrated in FIG. 1. FIG. 3 is a plan view of the first lamp socket of the lamp assembly illustrated in FIG. 2. FIG. 4 is a partial cross-sectional view taken along a line 1-1' in FIG. 2. In FIGS. 2 to 4, the lamps set 110 and the lamp housing 120 are shown in a dotted line.

Referring to FIGS. 2 to 4, the first lamp socket 130 includes a first socket body 131 and a first terminal 132. The socket body 131 may be made of an insulative material such as a plastic or ceramic while the first terminal 132 is made of an electrically conductive material such as a nickel clad spring metal.

The first socket body 131 has a receiving space to receive an end portion of the lamps set 110.

The first terminal 132 is disposed in the receiving space of the first socket body 131 to electrically connect the first electrodes 114 of the lamps set 110 to each other and to the lamp housing 120. The first terminal 132 includes a first electrodes fixing portion 132a, a housing connecting portion 132b and an interconnect portion 132c.

The first electrodes fixing portion 132a is electrically connected to the first electrodes 114 of the lamps set 110, and fixes and supports the first electrodes 114. In an exemplary embodiment, the first electrodes fixing portion 132a has a shape for clamp-wise gripping the first electrodes 114.

The housing connecting portion 132b is electrically connected to the lamp housing 120. The lamp housing 120 includes a terminal contact portion 122a protruding from a surface of the lamp housing 120 to be electrically connected to the housing connecting portion 132b. As shown in FIGS. 2 to 4, the housing connecting portion 132b may have a spring-clip shape so that the terminal contact portion 122a may be resiliently inserted into electrical contact with the housing connecting portion 132b.

The first electrodes fixing portion 132a and the housing connecting portion 132b are electrically connected to each other through the extension portion 132c.

The first lamp socket 130 has an opening through which the lamps set 110 is received in the first lamp socket 130. The first lamp socket 130 may further include a first cover 133 for covering the opening and thus protecting the interior of the first lamp socket 130 from entry of debris or other undesirable materials.

In FIG. 2, the first cover 133 is hingedly-coupled to the first socket body 131. Thus, the first cover 133 may be rotated with respect to the first socket body 131. After the lamps set 110 is positioned in the receiving space of the first socket body 131, the first cover 133 is rotated to cover the lamps-receiving space of the first socket body 131. Alternatively, the first cover 133 may be coupled to the first socket body 131 by using a flexible and plastically deformable material, or by various other methods.

A throughhole may be formed at the first lamp socket 130. In an exemplary embodiment, the first lamp socket 130 has a throughhole 134 formed through a bottom surface of the first socket body 131. The lamp housing 120 includes a terminal contact portion 122a protruding from a surface of the base plate 122 and inwardly extending into the first lamp socket 130 through the throughhole 134. For example, the housing connecting portion 132b has a spring-clip shape into which the terminal contact portion 122b is inserted.

The first lamp socket 130 may further include a set of first coupling protrusions 135 formed on both outer sides of the first socket body 131. The first coupling protrusions 135 are disposed in corresponding opposition to the first throughhole 124a of the first sidewall 124 and the second throughhole 126a of the second sidewall 126. Thus, the first lamp socket 130 may be snap-fit fastened to the lamp housing 120 through the mating of the first coupling protrusions 135 and the first and second throughholes 124a and 126a. In one embodiment, the first coupling protrusions 135 are made of a resilient and electrically insulative plastic or an alike material. In an alternative embodiment (not shown), the first coupling protrusions 135 are made of a resilient and electrically conductive metal or an alike material and may be used for providing electrical connection between the lamp housing and the first electrodes fixing portion 132a.

The first lamp socket 130 may further include a dielectric separation rib 136 that protrudes from an inner surface of the first socket body 131 and extends between the first electrodes 114 of the lamps set 110. The rib 136 may prevent an undesirable corona effect from developing due to the electric field that is generated between the first electrodes 114 of the lamps set during ignition. In FIGS. 2 to 4, the rib 136 is formed on the first socket body 131. Alternatively, the rib 136 may be formed on the first cover 133 and brought between the lamps when the cover is closed, or it may be partially formed both on the first socket body 131 and the first cover 133. In this case, the rib formed on the first socket body 131 and the rib formed on the second cover 133 may be arranged to mate with one another.

Referring again to FIG. 1, the second lamp socket 140 is disposed in the receiving space of the lamp housing 120. The second lamp socket 140 receives and fixes the right end portions of the lamps set 110, and electrically connects the second electrodes 116 respectively of the lamps set 110 to respective power supply a wires 147 externally provided from a lamps-driving power supply (not shown). Thus, the second lamp socket 140 applies a power voltage externally provided to the second electrodes 116 of the lamps set 110.

Hereinafter, the second lamp socket 140 will be described in detail with reference to the accompanying drawings.

Figure 5:
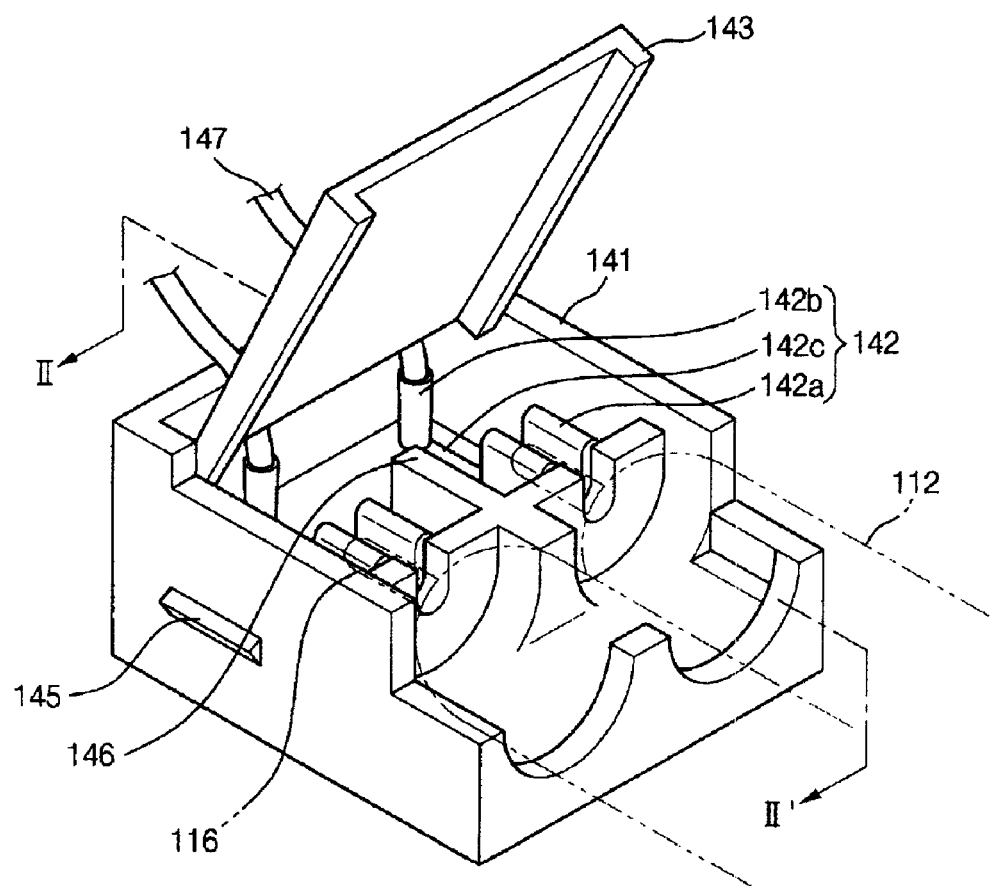
FIG. 5 is an enlarged perspective view of the second lamp socket of the lamp assembly illustrated in FIG. 1.
Figure 6:
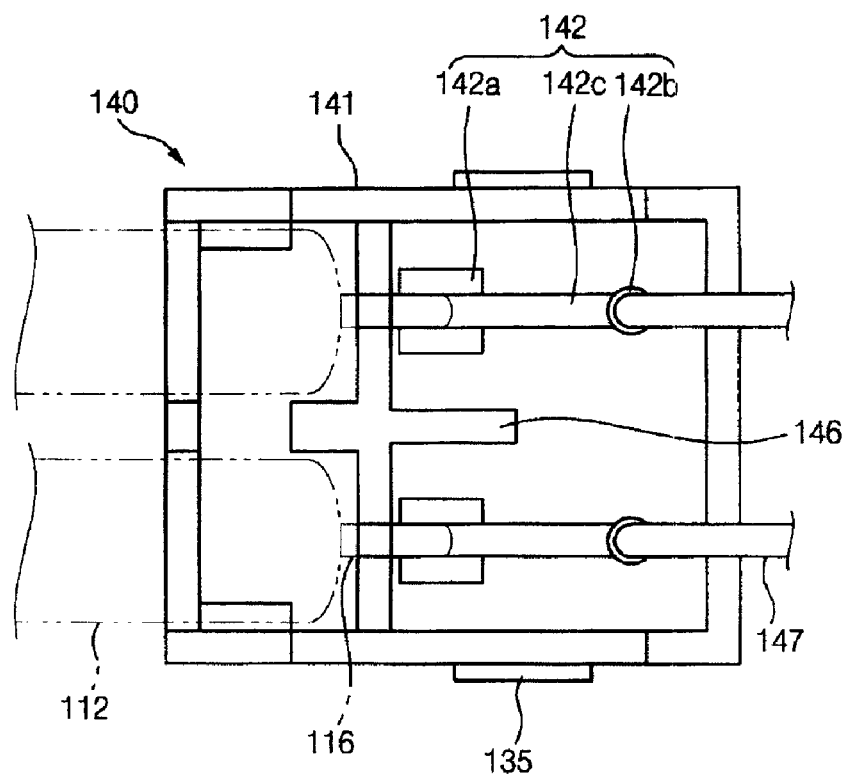
FIG. 6 is a plan view of the second lamp socket of the lamp assembly illustrated in FIG. 5.
Figure 7:
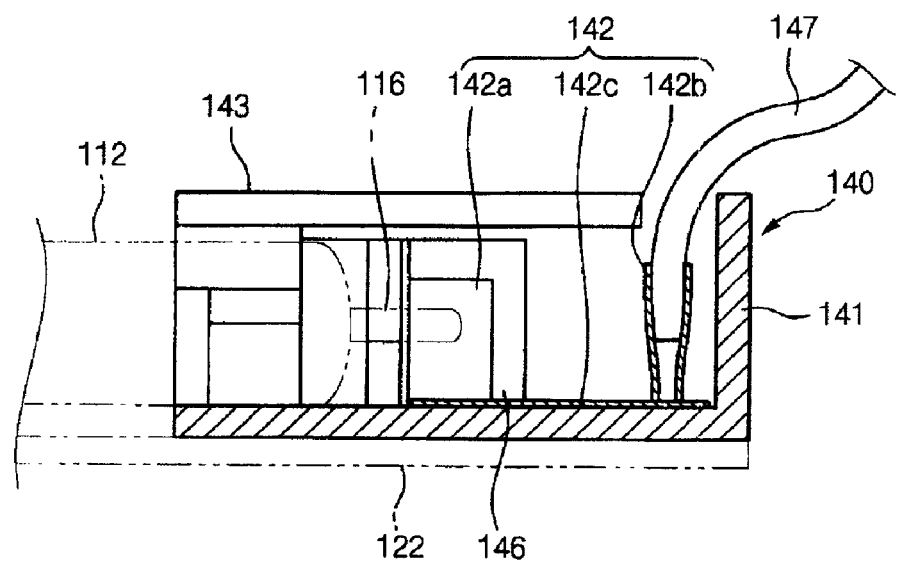
FIG. 7 is a partial cross-sectional view taken along a line II-II' in FIG. 5.

FIG. 5 is an enlarged perspective view of the second lamp socket of the lamp assembly illustrated in FIG. 1. FIG. 6 is a plan view of the second lamp socket of the lamp assembly illustrated in FIG. 5. FIG. 7 is a partial cross-sectional view taken along a line II-II' in FIG. 5.

Referring to FIGS. 5 to 7, the second lamp socket 140 includes a second socket body 141 and a second terminal 142. The socket body 141 may be made of an insulative material such as a plastic or ceramic while the second terminal 142 is made of an electrically conductive material such as a nickel clad spring metal.

The second socket body 141 has a receiving space for receiving an end portion of the lamps set 110.

The second terminal 142 is disposed in the receiving space of the second socket body 141 to electrically connect the second electrodes 116 of the lamps set 110 to the respective power supply wires 147. The second terminal 142 includes a second electrodes fixing portion 142a, a wires connecting portion 142b and an interconnect portion 132c.

The second electrodes fixing portion 142a is electrically connected to the second electrode 116 of the lamps set 110, and fixes and supports the second electrodes 116. In an exemplary embodiment, the second electrodes fixing portion 142a has a pair of clamp shaped clips for respectively gripping the second electrodes 116.

The wires connecting portion 142b is electrically connected to the power supply wires 147. The power supply wires 147 are electrically connected to a power supply unit (not shown). As shown in FIGS. 5 to 7, the wires connecting portion 142b may have a pair of cylindrically shaped, wire receiving clips so that the power supply wires 147 may be resiliently inserted into the wire connecting portion 142b for electrical contact therewith. Alternatively, the wire connecting portion 142b may have various other shapes so that the power supply wires 147 may be fixed and electrically connected to the second electrode fixing portion 142a.

The second electrode fixing portion 142a and the wires connecting portion 142b are electrically connected to each other through the extension or interconnect portion 142c.

The second lamp socket 140 has an opening through which the lamps set 110 is received in the second lamp socket 140. The second lamp socket 140 may further include a second cover 143 for covering the opening.

In FIG. 5, the second cover 143 is hinge-coupled to the second socket body 141. Thus, the second cover 143 may be rotated with respect to the second socket body 141. After the lamps set 110 is positioned in the receiving space of the second socket body 141, the second cover 143 is rotated to cover the second socket body 141 and protect its interior from entry of debris or other undesirable materials. Alternatively, the second cover 143 may be coupled to the second socket body 141 by using a flexible material, or by various other methods.

The second lamp socket 140 may further include second coupling protrusions 145 formed on both sides of the second socket body 141. The second coupling protrusions 145 are disposed in corresponding opposition to the first throughhole 124b of the first sidewall 124 and the second throughhole 126b of the second sidewall 126. Thus, the second lamp socket 140 may be snap-fit fastened to the lamp housing 120 through mating of the second coupling protrusions 145 with the first and second throughholes 124b and 126b.

The second lamp socket 140 may further include a dielectric rib 146 that protrudes from an inner surface of the second socket body 141 and extends between the second electrodes 116 of the lamps 110. The rib 146 may prevent an undesirable arcing or other effect due to a high voltage electric field that may be generated between the second electrodes 116. In FIGS. 5 to 7, the rib 146 is formed on the second socket body 141. Alternatively, the rib 146 may be formed on the second cover 143, or may be formed on both the second socket body 141 and the second cover 143. In this case, the rib formed on the first socket body 141 and the rib formed on the second cover 143 may be arranged to mate with one another.

Figure 8A:
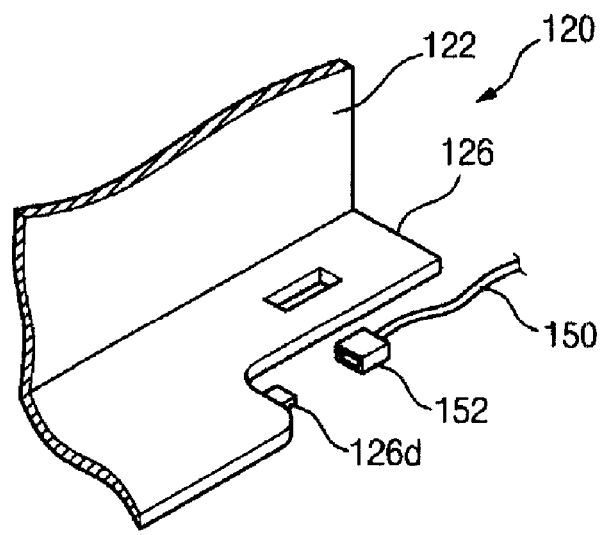
FIGS. 8A and 8B are partial perspective views illustrating an exemplary embodiment of the connection between a tap terminal and a tap connection portion of the lamp assembly illustrated in FIG. 1.
Figure 8B:
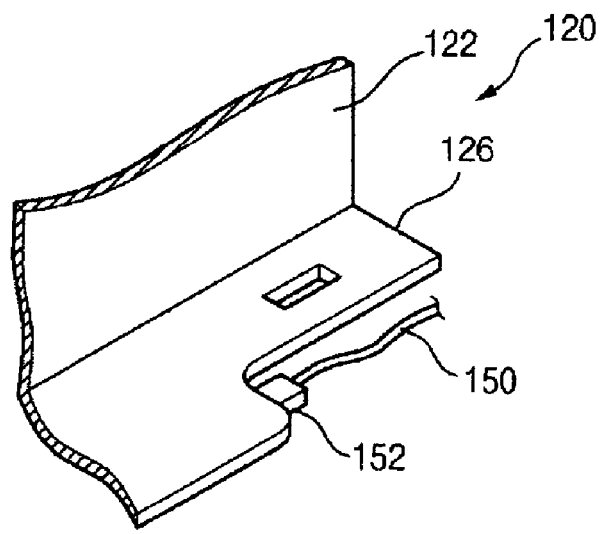

FIGS. 8A and 8B are partial perspective views illustrating an exemplary embodiment of the connection between a tap-return terminal and a tap connection portion of the lamp assembly illustrated in FIG. 1.

Referring to FIGS. 8A and 8B, the lamp housing 120 may further include a tap connection portion 126d.

The tap connection portion 126d protrudes from an electrically-conductive portion of the sidewall protruding portion 126c of the second sidewall 126 in a longitudinal direction of the lamp housing 120.

The tap connection portion 126d is electrically connected to a tap-return wire 150 externally provided, and the tap-return wire 150 is electrically connected to a power supply unit (not shown). The power supply unit may thus receive a tap-point feedback signal from the first electrodes 114 that are positioned at the other end of the lamp housing 120.

In one embodiment, high voltage power signals of opposite polarity are respectively applied to the second electrodes 116 to thereby ignite and drive the lamps set 110. A feedback signal such as a voltage level reduced to a predetermined value is feedbacked from the juncture of the first electrodes 114, and the low-voltage feedback signal is provided to the power supply unit through the lamp housing 120 and the tap-return wire 150. The feedback signal can be used as a reference signal to control balanced luminance of the lamps in set 110, and stability of the power supply unit may be secured by such balanced operation of the lamps set. As a result, the power supply unit may stably drive the lamps set 110.

A tap-return terminal 152 is formed at an end portion of the tap wire 150 such that the tap connection portion 126d may be electrically connected to the tap wire 150.

In FIGS. 8A and 8B, the tap terminal 152 has a socket shape such that the tap connection portion 126d having a protrusion shape may be inserted into the tap terminal 152. Alternatively, the tap terminal 152 may have various other shapes to be coupled to the tap connection portion 126d. p In FIGS. 8A and 8B, the tap connection portion 126d is formed on the sidewall protruding portion 126c of the second sidewall 126. Alternatively, since the main body of lamp housing 120 is electrically conductive in one embodiment, the tap connection portion 126d may be formed at various other positions of the lamp housing 120 for allowing convenient coupling of the tap return wire 150 to the tap-point formed at the electrical juncture of first electrodes 114.

In FIGS. 8A and 8B, the tap-return wire 150 is just one wire. Alternatively, a number of integral but separate conduction paths may be formed through the lamp housing and the tap return wire set (150) may include two or more wires corresponding to the number of tap points defined by the lamps set (110).

Figure 9A:
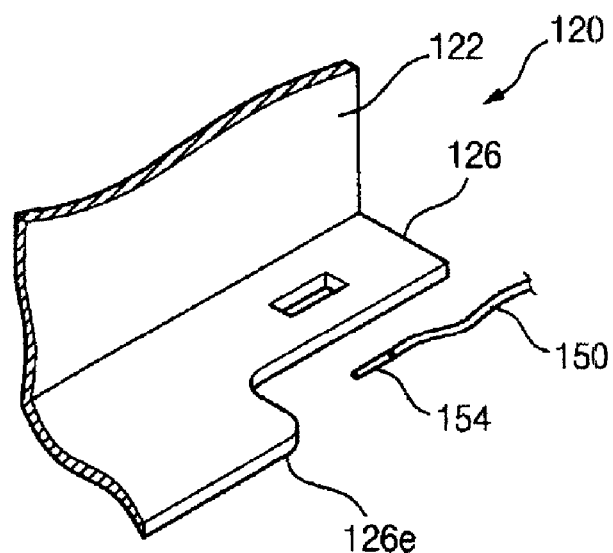
FIGS. 9A and 9B are partial perspective views illustrating another exemplary embodiment of the connection between a tap terminal and a tap connection portion of the lamp assembly illustrated in FIG. 1.
Figure 9B:
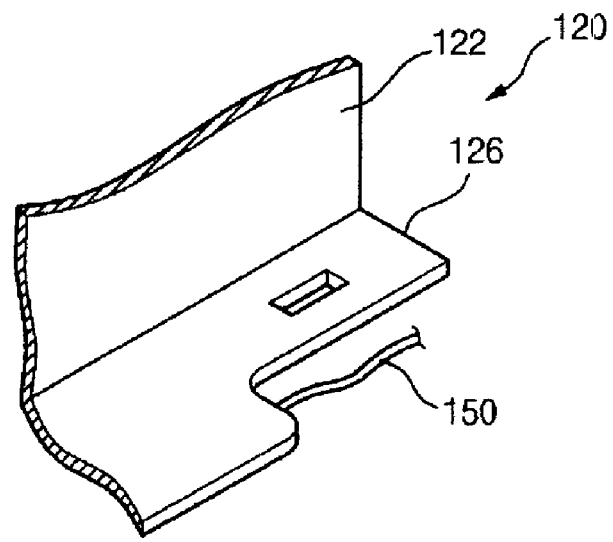

FIGS. 9A and 9B are partial perspective views illustrating another exemplary embodiment of the connection between a ground or tap terminal and a ground or tap connection portion of the lamp assembly illustrated in FIG. 1.

Referring to FIGS. 9A and 9B, the lamp housing 120 has a ground connection portion 126e with a wire receiving groove (not shown) or other wire receiving and contacting means defined therein or thereon.

The ground connection portion 126e corresponds to a portion of a lower surface of the sidewall protruding portion 126c of the second sidewall 126.

The ground connection portion 126e is electrically connected to the ground wire 150 externally provided, and the ground wire 150 is electrically connected to a power supply unit (not shown). The power supply unit may receive a feedback signal from the first electrodes 114.

Particularly, a power voltage is applied to the second electrodes 116 to drive the lamps set 110. A feedback signal such as a voltage level reduced to a predetermined value is feedbacked from the first electrodes 114, and the feedback signal is provided to the power supply unit through the lamp housing 120 and the ground wire 150. Thus, the feedback signal is used as a reference signal to control luminance of the lamps set 110, and stability of the power supply unit may be secured. As a result, the power supply unit may stably drive the lamps set 110.

An exposed grounding terminal 154 is formed at an end portion of the ground wire 150 such that the ground connection portion 126e may be electrically connected to the ground wire 150.

In FIGS. 9A and 9B, the grounding terminal 154 has a flat shape to be crimp-wise or otherwise connected to the ground connection portion 126e having a groove with a corresponding flat surface. Alternatively, the ground terminal 154 may have various other shapes to be coupled to the ground connection portion 126e via soldering, welding, taping or other ways.

The ground terminal 154 may be electrically connected to the ground connection portion 126e through a conductive adhesive, a conductive adhesive tape, a solder, etc.

In FIGS. 9A and 9B, the ground connection portion 126e corresponds to a portion of the lower surface of the sidewall protruding portion 126c of the second sidewall 126. Alternatively, since the lamp housing 120 is electrically conductive, the ground connection portion 126e may be formed at various other positions of the lamp housing 120.

In FIGS. 9A and 9B, the ground wire 150 includes one wire. Alternatively, the ground wire 150 may include two wires or more corresponding to the number of tap points in the lamps set 110.

Figure 10A:
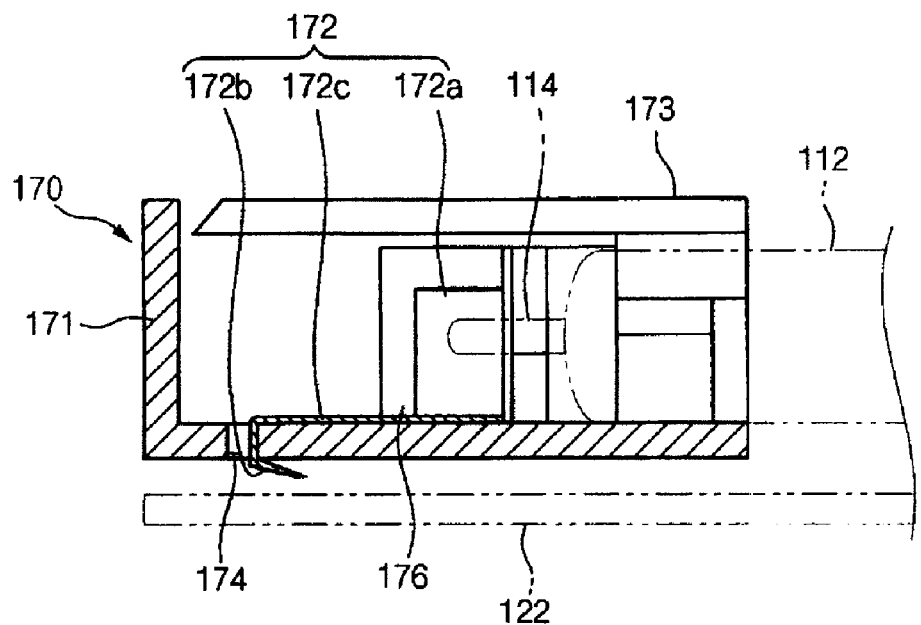
FIGS. 10A and 10B are cross-sectional views illustrating a first lamp socket of a lamp assembly according to another exemplary embodiment.
Figure 10B:
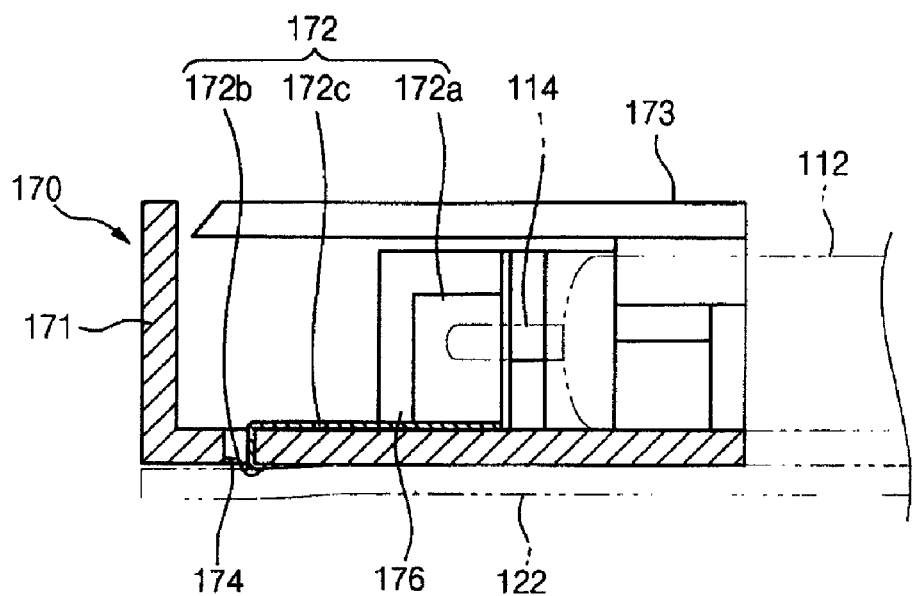

FIGS. 10A and 10B are cross-sectional views illustrating a first lamp socket of a lamp assembly according to another exemplary embodiment.

Referring to FIGS. 10A and 10B, a first lamp socket 170 includes a first socket body 171 made of an insulative material (i.e., plastic), a first terminal 172, a first cover 173, a throughhole 174, a first coupling protrusion (not shown) and a rib 176.

The first terminal 172 includes a first electrodes fixing portion 172a, a housing connecting portion 172b and an extension portion 172c.

In one embodiment, the first lamp socket 170 is substantially the same as the first lamp socket 130 illustrated in FIGS.

2 to 4 except for the housing connecting portion 172b. Thus, any further description will be omitted.

The housing connecting portion 172b outwardly extends from the insulative first lamp socket 171 through the throughhole 174. The extending housing connecting portion 172b is electrically conductive makes electrical contact with a conductive contact portion of the inner surface of the base plate 122 of the lamp housing 120. Thus, the first electrodes 114 of the lamps set 110 may be electrically connected to the lamp housing 120 through the first terminal 172.

As shown in FIGS. 10A and 10B, the housing connecting portion 172b has a resilient or spring structure for applying an elastic contact force to the base plate 122 of the lamp housing 120, when the first lamp socket 170 and the lamp housing 120 is coupled to each other. Thus, the housing connecting portion 172b may make reliable and strong contact with the base plate 122 of the lamp housing 120.

The base plate 122 of the lamp housing 120 of FIGS. 10A-10B does not include the terminal contact portion 122a shown in FIGS. 2 to 4. Thus, the lamp assembly may have a more simplified structure.

Figure 11A:
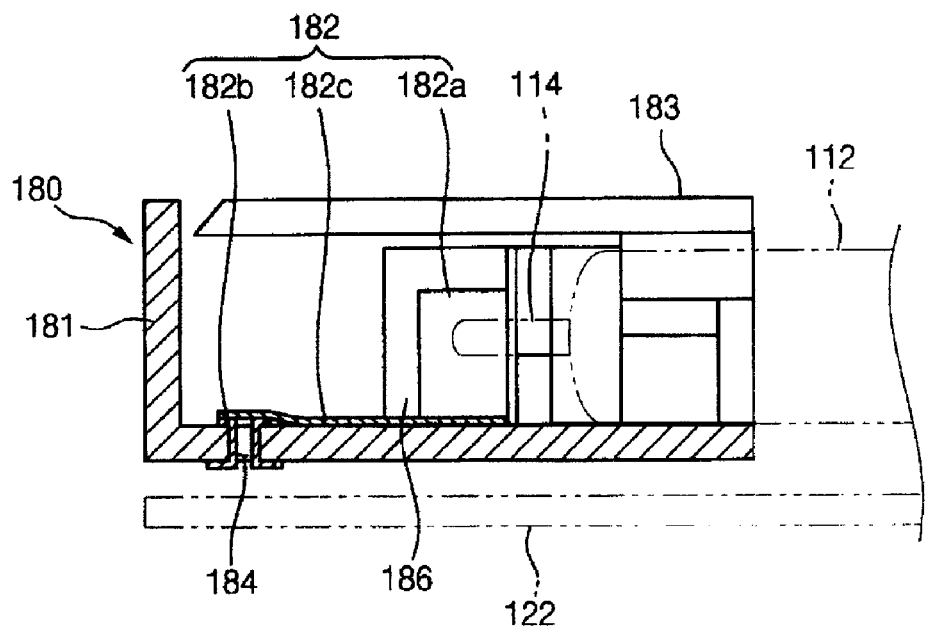
FIGS. 11A and 11B are cross-sectional views illustrating a first lamp socket of a lamp assembly according to still another exemplary embodiment.
Figure 11B:
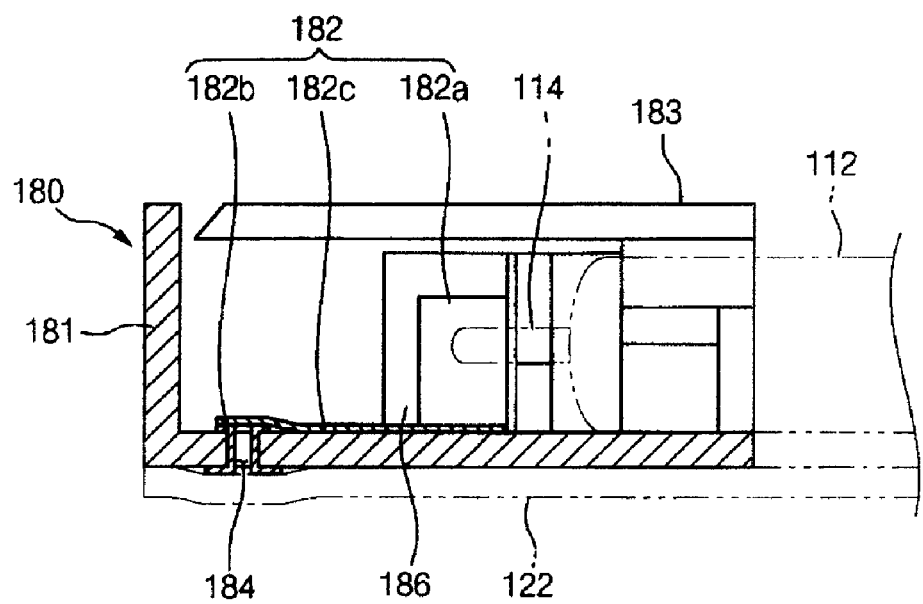

FIGS. 11A and 11B are cross-sectional views illustrating a first lamp socket of a lamp assembly according to still another exemplary embodiment.

Referring to FIGS. 11A and 11B, the first lamp socket 180 includes a first socket body 181, a first terminal 182, a first cover 183, a throughhole 184, a first coupling protrusion (not shown) and a rib 186.

The first terminal 182 includes a first electrodes fixing portion 182a, a housing connecting portion 182b and an extension portion 182c.

The first lamp socket 180 is substantially the same as the first lamp socket 130 illustrated in FIGS. 2 to 4 except for the housing connecting portion 182b. Thus, any further description will be omitted.

The housing connecting portion 182b is electrically conductive and is formed on the insulative first socket body 181 to pass through the throughhole 184. Particularly, the housing connecting portion 182b is formed on inner and outer surfaces of the first lamp socket body 181 that are adjacent to the throughhole 184 and a portion of the first lamp socket 181 that connects the inner and outer surfaces and defines the throughhole 184. The housing connecting portion 182b makes contact with the extension portion 182c and an inner conductive surface portion of the base plate 122 of the lamp housing 120. Thus, the first electrodes 114 of the lamps set 110 are electrically connected to the lamp housing 120 through the first terminal 182.

The base plate 122 of the lamp housing 120 of FIGS. 11A-11B does not include the terminal contact portion 122a shown in FIGS. 2 to 4. Thus, the lamp assembly may have a more simplified structure.

Figure 12:
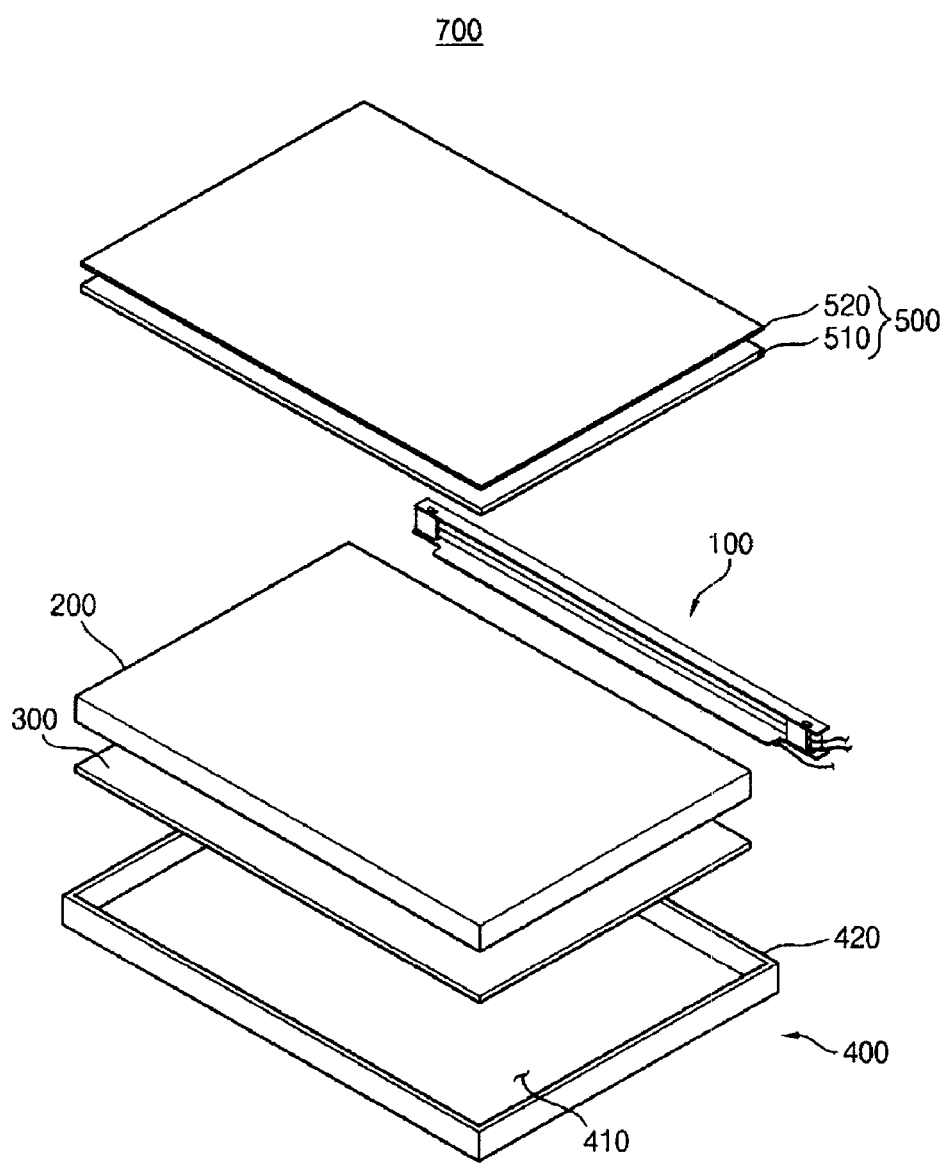
FIG. 12 is an exploded perspective view illustrating a backlighting assembly according to an exemplary embodiment.

FIG. 12 is an exploded perspective view illustrating a backlighting assembly 700 according to an exemplary embodiment.

Referring to FIG. 12, the backlighting assembly 700 includes a lamp assembly 100, a light guiding member 200, a light reflecting member 300 and a receiving container or tray 400.

The lamp assembly 100 is substantially the same as the lamp assembly 100 illustrated in FIG. 1. Thus, any further description concerning substantially the same parts will be omitted.

Figure 13:
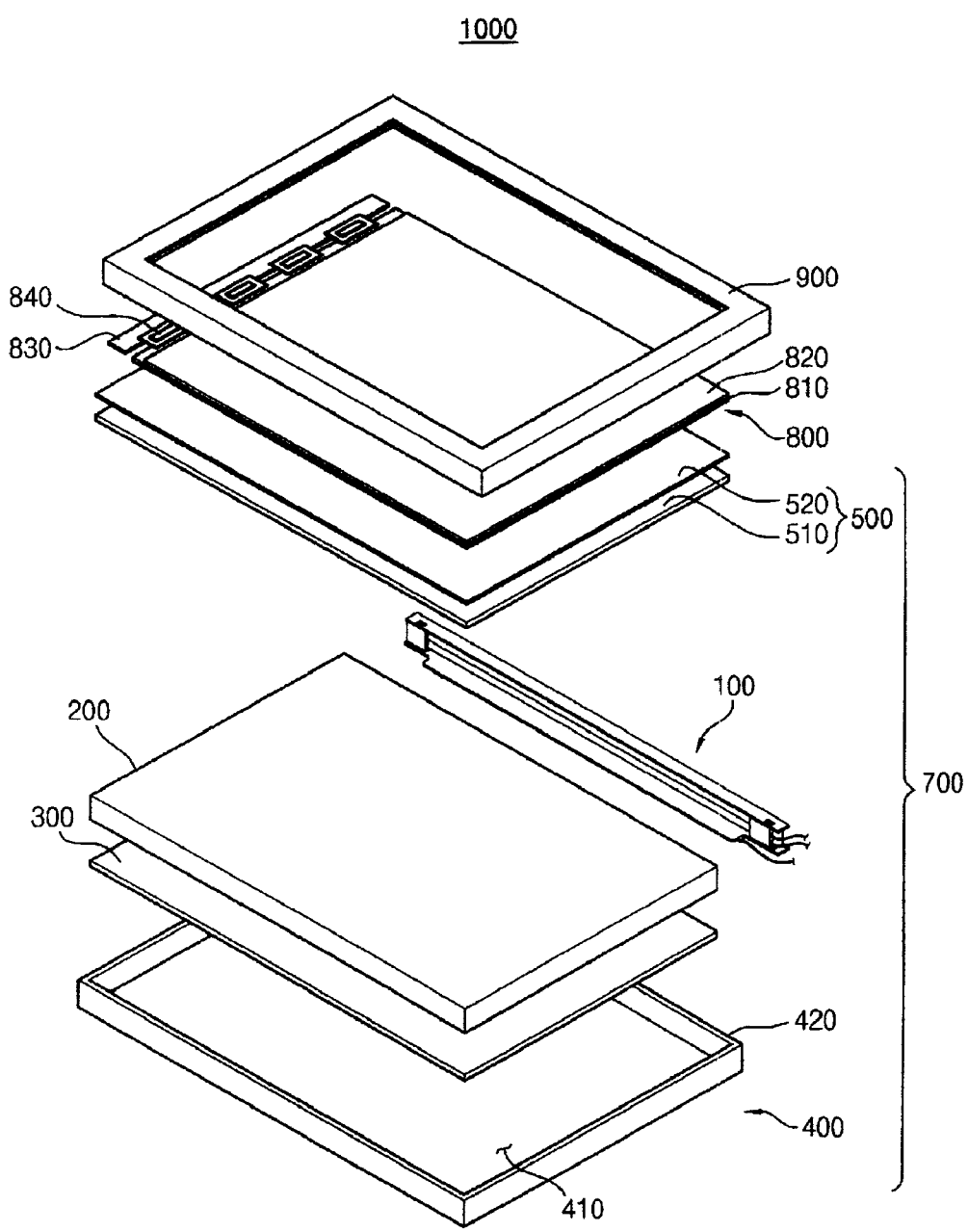
FIG. 13 is an exploded perspective view illustrating a liquid crystal display device according to an exemplary embodiment.

The light guiding member 200 receives the light generated from the lamp assembly 100 at a side edge of the light guiding member and guides the light for projection upwardly to the overlying optical coupling member 500 and thereafter to the LCD panel 810-820 (FIG. 13).

The light reflecting member 300 has, for example, a sheet shape, and reflects light leaked downwardly from the light guiding member 200 back upwardly to the light guiding member 200.

The receiving container 400 includes a bottom plate 410 and a sidewall 420 protruding from the bottom plate 410. The bottom plate 410 and the sidewall 420 define a receiving space, and the lamp assembly 100, the light guiding member 200, and the light reflecting member 300 are received in the receiving space.

The backlight assembly 700 may further include an optical coupling member 500. The optical member 500 is disposed over the light guiding member 200, and includes, for example, a light-diffusing plate 510 and at least one optical sheet 520. The light-diffusing plate 510 receives the light that exits the light guiding member 200, and diffuses the light. The optical sheet 520 receives the diffused light from the light-diffusing plate 510, and improves optical characteristics of the diffused light such as polarization of the light.

The backlight assembly 700 illustrated in FIG. 12 employs the lamp assembly 100 illustrated in FIG. 1. Here, the lamp assembly 100 has a ground structure using the ground terminal 152 and the ground connection portion 126d shown in FIGS. 8A and 8B. Alternatively, the lamp assembly 100 may have a ground structure using the ground terminal 154 and the ground connection portion 126e shown in FIGS. 9A and 9B.

Since the backlight assembly 700 illustrated in FIG. 12 employs the lamp assembly 100 illustrated in FIG. 1, the backlight assembly 700 includes the first lamp socket 130 illustrated in FIGS. 2 to 4. Alternatively, the backlight assembly 700 may include the first lamp socket 170 illustrated in FIGS. 10A to 10B. Alternatively, the backlight assembly 700 may include the first lamp socket 180 illustrated in FIGS. 11A to 11B.

FIG. 13 is an exploded perspective view illustrating a liquid crystal display device 1000 according to an exemplary embodiment.

Referring to FIG. 13, the display device 1000 includes a backlighting assembly 700, a display panel 800 and a chassis 900.

The backlighting assembly 700 is substantially the same as the backlighting assembly 700 illustrated in FIG. 12. Thus, any further description concerning substantially the same parts will be omitted.

The display panel 800 includes a first substantially transparent substrate 810, a second substantially transparent substrate 820 facing the first substrate 810 and a liquid crystal material layer (not shown) interposed between the first and second substrates 810 and 820.

The first substrate 810 includes pixel electrodes (not shown) that are arranged in a matrix shape and made of a transparent conductive material. The first substrate 810 includes thin film transistors (TFTs) (not shown) each of which switches a driving signal of an associated pixel electrode.

The second substrate 820 includes one or more color filters (not shown) that selectively transmit lights having predetermined wavelengths (i.e., red, green and blue). The second substrate 820 includes a common electrode (not shown) that capacitively opposes the pixel electrodes of the first substrate 810 and is made of a transparent conductive material.

The display panel 800 may further include a printed circuit board (PCB) 830 and a printed circuit film 840. The PCB 830 generates a driving signal driving the display panel 800. The PCB 830 is electrically connected to an edge portion of the first substrate 810 through the printed circuit film 840.

The driving signal from the PCB 830 generates an electric field between the first substrate 810 and the second substrate 820 to rearrange liquid crystal molecules of the liquid crystal layer interposed between the first substrate 810 and the second substrate 820. Thus, optical transmissivity of the light provided from the optical member 500 is changed to display an image having a desired gray scale or colored intensities of the display device 1000.

According to the present disclosure, a lamp assembly may include a first lamp socket structured so that a lamp is fastened to and coupled to a lamp housing, and cold electrodes of first and second lamps are electrically connected to the lamp housing having electrical conductivity.

Accordingly, since the cold electrodes may be electrically connected to a power supply unit through the lamp housing and thus grounded at a series tap point of the lamps, a conventional return wire may be omitted, thereby simplifying a structure of the lamp assembly.

Also, since the lamp socket electrically connects the lamp and a power supply wire to each other, a conventional soldering process may be omitted, thereby simplifying the manufacturing process of the lamp assembly.

Therefore, the number of parts of the lamp assembly may be reduced, and manufacturing process may be simplified, thereby reducing manufacturing cost of the lamp assembly.

Although exemplary embodiments have been described, it is understood that the scope of the inventive subject matter described herein should not be limited to specific aspects of these exemplary embodiments and that various changes and modifications can be made by one of ordinary skill in the art after having read this disclosure where the changes and modifications are within the spirit and scope of the present disclosure.

What is claimed is:

1. A lamp assembly comprising:
   a lamp having a first electrode and a second electrode, the lamp being structured to externally receive a power voltage through the second electrode to generate light;
   a lamp housing receiving the lamp, the lamp housing having a base wall and first and second sidewalls extending integrally from the base wall; and
   a first lamp socket disposed in the lamp housing, the first lamp socket comprising a first socket body receiving at least a portion of the lamp and a first terminal including a first electrode fixing portion fixing the first electrode and a housing connecting portion extending from the first electrode fixing portion,
   wherein a portion of the first socket body has a through-hole defined there-through, and the first electrode is electrically connected to the lamp housing by resiliently contacting the lamp housing with the housing connecting portion through the through-hole and without a soldering of the housing connecting portion to the lamp housing.

2. The lamp assembly of claim 1, wherein the first lamp socket has an opening through which at least a portion of the lamp is received in the first lamp socket, and the first lamp socket further comprises a first cover covering the opening.

3. The lamp assembly of claim 2, wherein the first cover is hinge coupled to the first socket body.

4. The lamp assembly of claim 1 wherein the first electrode fixing portion is electrically connected to the first electrode, and the first electrode fixing portion supports the first electrode;
   and wherein the first terminal comprises
   an extension portion electrically connecting the first electrode fixing portion to the housing connecting portion.

5. The lamp assembly of claim 4, wherein housing connecting portion comprises a terminal contact portion protruding from a surface of the lamp housing and extending into the first body through the through-hole.

6. The lamp assembly of claim 5, wherein the housing connecting portion has a clip shape into which the terminal contact portion is inserted.

7. The lamp assembly of claim 1, wherein the housing connecting portion extends out from the first lamp socket through the through-hole and electrically connects the first electrode to an inner surface of the lamp housing.

8. The lamp assembly of claim 1, wherein the housing connecting portion is formed on inner and outer surfaces of the first lamp socket that are adjacent to the through-hole and a portion of the first lamp socket that connects the inner and outer surfaces and defines the through-hole to electrically connect the first electrode to an inner surface of the lamp housing.

9. The lamp assembly of claim 1, wherein at least two lamps are received in the lamp housing, and the first lamp socket further comprises a rib protruding from an inner surface of the first lamp socket and extending between the first electrodes of the lamps.

10. The lamp assembly of claim 1, further comprising a second lamp socket disposed in the lamp housing to receive a portion of the lamp and to fix the lamp, the second lamp socket electrically connecting the second electrode of the lamp to a power supply wire externally provided.

11. The lamp assembly of claim 10, wherein the second lamp socket comprises:
    a second socket body having a receiving space to receive a portion of the lamp; and
    a second terminal disposed in the receiving space of the second socket body to electrically connect the second electrode of the lamp to the power supply wire.

12. The lamp assembly of claim 11, wherein the second lamp socket has an opening through which at least a portion of the lamp is received in the second lamp socket, and the second lamp socket further comprises a second cover covering the opening and hinge-coupled to the second socket body.

13. The lamp assembly of claim 11, wherein the second terminal comprises:
    a second electrode fixing portion electrically connected to the second electrode, the second electrode fixing portion fixing and supporting the second electrode; and
    a wire connecting portion electrically connected to the power supply wire.

14. The lamp assembly of claim 1, wherein the lamp housing is electrically conductive, and includes a material reflecting light.

15. A backlight assembly comprising:
    a lamp having a first electrode and a second electrode, the lamp generating light;
    a lamp reflector electrically connected to the first electrode of the lamp and electrically insulated from the second electrode of the lamp, the lamp reflector having a base wall and first and second sidewalls extending integrally from the base wall;
    a power supply unit receiving a feedback signal from the first electrode of the lamp through the lamp reflector and providing a power voltage to the second electrode of the lamp; and
    a first lamp socket disposed in the lamp reflector, the first lamp socket comprising a first socket body receiving at least a portion of the lamp and a first terminal including a first electrode fixing portion fixing the first electrode and a housing connecting portion extending from the first electrode fixing portion, wherein a portion of the socket body has a through-hole defined there-through, and the first electrode is electrically connected to the lamp reflector by resiliently contacting the lamp reflector with the housing connecting portion through the through-hole and without a soldering of the housing connecting portion to the lamp reflector.

16. The backlight assembly of claim 15, further comprising:

a second lamp socket disposed in the lamp reflector to receive a portion of the lamp and to fix the lamp, the second lamp socket electrically connecting the second electrode of the lamp to a power supply wire externally provided.

17. The backlight assembly of claim 15, wherein the lamp reflector comprises a ground connection portion, the ground connection portion being electrically connected to a ground wire that transmits the feedback signal to the power supply unit.

18. The backlight assembly of claim 17, wherein the ground connection portion protrudes from a surface of the lamp reflector, and a ground terminal is formed at an end portion of the ground wire such that the ground connection portion is inserted into the ground terminal.

19. The backlight assembly of claim 17, wherein the ground connection portion corresponds to a portion of a surface of the lamp reflector, and a ground terminal is formed at an end portion of the ground wire such that the ground connection portion makes contact with the ground terminal.

20. A display device comprising:

a display panel displaying an image by using light; and a backlight assembly providing the light to the display panel, the backlight assembly comprising:

a lamp assembly comprising a lamp having a first electrode and a second electrode and externally receiving a power voltage through the second electrode to generate light, a lamp housing receiving the lamp, and a first lamp socket that is disposed in the lamp housing;

the first lamp socket comprising a first socket body receiving at least a portion of the lamp and a first terminal including a first electrode fixing portion fixing the first electrode and a housing connecting portion extending from the first electrode fixing portion; and a light guiding member guiding light generated from the lamp assembly and provide the light to the display panel, wherein a portion of the socket body has a through-hole defined there-through, and the first electrode is electrically connected to the lamp housing by resiliently contacting the lamp housing with the housing connecting portion extending through the through-hole and without a soldering of the housing connecting portion to the lamp reflector, and wherein the lamp housing has a base wall and first and second sidewalls extending integrally from the base wall.

21. A method comprising:

providing a lamp reflector having an electrical conduction path integrally extending in the lamp reflector between first and second spaced-apart portions of the lamp reflector, the lamp reflector having a base wall and first and second sidewalls extending integrally from the base wall;

electrically coupling a first lamp socket to the electrical conduction path at said first portion of the lamp reflector, where the first lamp socket comprises a first socket body receiving at least a portion of a lamp having a first and a second electrodes and a first terminal including a first electrode fixing portion fixing a first electrode of the lamp and a housing connecting portion extending from the first electrode fixing portion; and providing a tap point contact to the electrical conduction path at said second portion of the lamp reflector so as to thereby create a signal conduction path from the first lamp socket, through the electrical conduction path of the lamp reflector and to the tap point contact, wherein a portion of the socket body comprises a through-hole defined there-through, and the first electrode is electrically connected to the lamp reflector by resiliently contacting the lamp reflector with the housing connecting portion through the through-hole without soldering the housing connecting portion with the lamp reflector.

22. The method of claim 21, further comprising:

connecting a tap-point feedback wire between said tap point contact and a tap-point node of a supplied power supply so that the power supply can detect a tap-point voltage developed at said first lamp socket.

23. A method of connecting one or more elongated high voltage lamps to a high voltage power supply where each respective lamp has respective first and second electrodes at opposed ends of the respective lamp, the method comprising:

(a) disposing the high voltage lamps in an elongated lamp housing having a reflective back wall portion and sidewall portions integrally extending from the back wall portion, where inner surfaces of the back and sidewall portions face the one or more lamps and where the lamp housing has an electrical conduction path defined therein to extend between opposed ends of the elongated lamp housing and the electrical conduction path has first and second electrical contact areas at opposed end portions thereof;

(b) resiliently engaging the first electrode of a first of the lamps with a corresponding resilient first contact member, where the resilient first contact member is disposed in a first lamp-receiving socket situated inside the lamp housing and situated over or adjacent to the first electrical contact area of the lamp housing;

(c) pressingly engaging the first electrical contact area of the housing into solderless contact with a second contact member, where the second contact member electrically connects through the first lamp-receiving socket with the resilient first contact member and the second contact member provides solderless electrical contact with the first electrical contact area; and (d) engaging the second electrical contact area with a third contact member, where the third contact member electrically connects to the power supply.

24. The method of claim 23 wherein the second contact member is situated outside of the first lamp-receiving socket and the second contact member electrically connects with the resilient first contact member by way of a conductor passing through a through-hole defined in the first lamp-receiving socket.

* * * * *